UNITED STATES PATENT OFFICE.

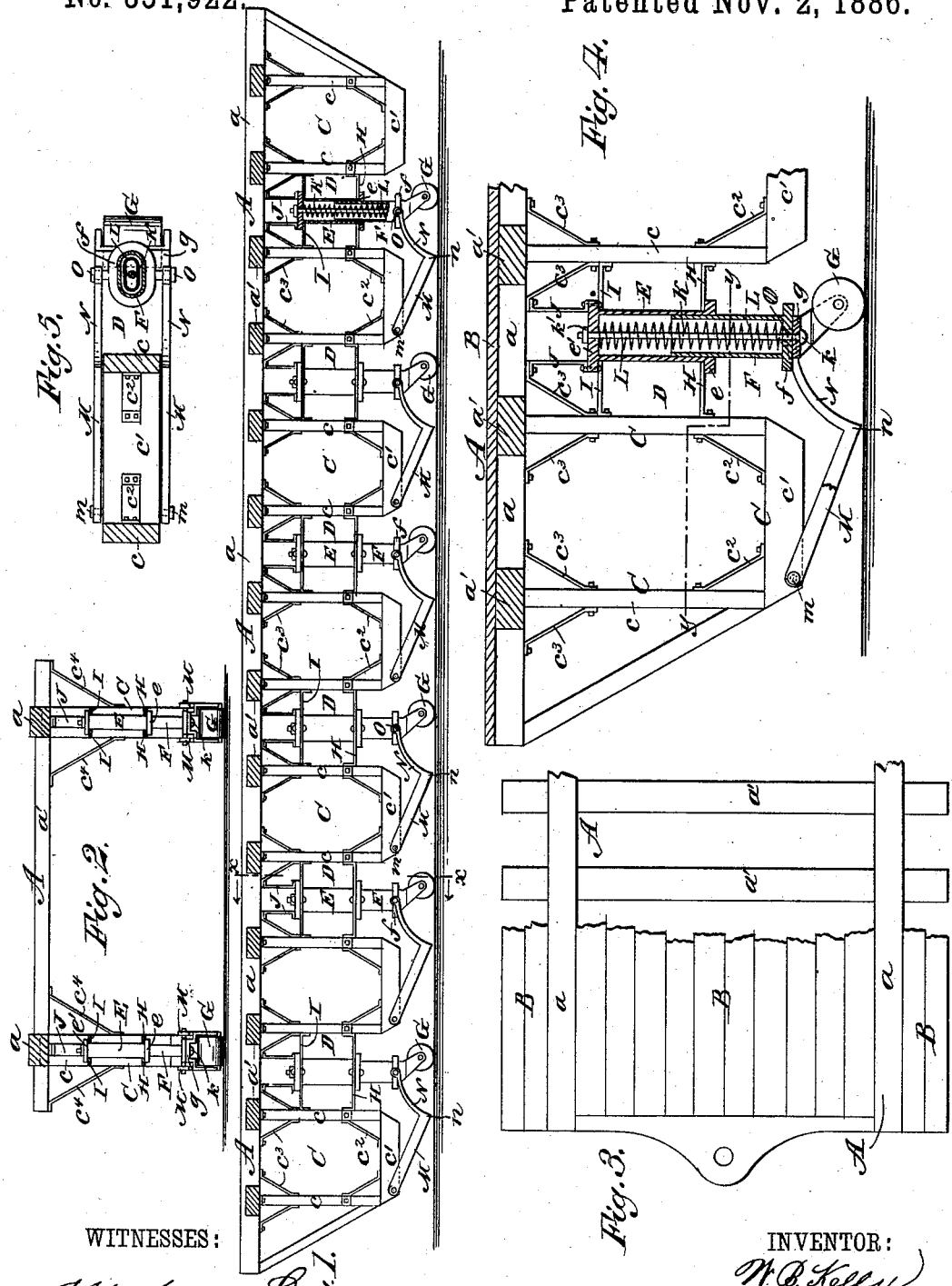

WILLIAM B. KELLY, OF ST. LOUIS, MISSOURI.

WHEELED VEHICLE.

SPECIFICATION forming part of Letters Patent No. 351,922, dated November 2, 1886.

Application filed March 26, 1886. Serial No. 196,667. (No model.)

*To all whom it may concern:*

Be it known that I, WILLIAM BERNARD KELLY, of the city of St. Louis and State of Missouri, have invented a new and useful Improvement in Wheeled Vehicles, of which the following is a full, clear, and exact description.

My invention relates to wheeled vehicles, and has for its object to provide an easy-running vehicle, which will readily pass over obstructions in the road, and will roll or level and harden the road rather than cut ruts into it.

The invention consists in certain novel features of construction and combinations of parts of the vehicle, all as hereinafter fully described and claimed.

Reference is to be had to the accompanying drawings, forming a part of this specification, in which similar letters of reference indicate corresponding parts in all the figures.

Figure 1 is a longitudinal sectional elevation of a wheeled vehicle or truck embodying my improvements. Fig. 2 is a transverse vertical sectional elevation thereof, taken on the line $x$ $x$, Fig. 1. Fig. 3 is a plan view of one end part of the vehicle, with the platform-flooring partly broken away. Fig. 4 is an enlarged detail vertical longitudinal sectional elevation of part of the vehicle; and Fig. 5 is a sectional plan view taken on the line $y$ $y$, Fig. 4.

I make the top or platform frame, A, of the vehicle of longitudinal beams or stringers $a$ $a$, to which are joined securely the transverse cross-beams $a'$, the joints of the beams $a$ $a$ with beams $a'$ being preferably about eight or ten inches from the ends of the cross-beams, which may be from five to eight feet long, and the beams $a'$ may have any length as the load to be carried may require. A flooring, B, may be laid on the cross beams $a'$, which are shown thinner than the stringers $a$ by about the thickness of the flooring, the beams $a$ being about six by four inches in cross-section, and the beams $a'$ being about six by three inches in cross-section. The flooring B between the beams $a$ $a$ may be dispensed with when a vehicle-body of any kind is to be placed on the platform.

To the under side of each of the cross-beams $a'$, and directly beneath the stringer-beams $a$, at each side of the truck-platform, there are fixed the upper ends of pendent posts $c$, which are connected in pairs at their lower ends by a cross-bar, $c'$, whereby a series of timber-frames, C, are pivoted at each side of the vehicle, and these frames C are strongly braced by corner metal bars, $c^2$, at the inside and lower end, and are braced to the platform A by inside and outside brace-bars, $c^3$, as shown in Figs. 1 and 4, and also by braces $c^4$, as shown in Fig. 2.

Between the frame C at each side of the vehicle there are provided spaces D, in which are fitted the telescoping wrought-metal tubes E F, which carry the wheels G of the vehicle, as next explained. The telescoping tubes E F are made preferably in a flattened or approximately oval shape, and are arranged with their longer diameters in line with the stringer-beams $a'$, or lengthwise of the vehicle. The tube E is provided around its lower open end with a flange, $e$, to which are bolted the middle parts of opposite brace rods or bars, H H, the end parts of which are bolted to the posts $c$ $c$ of the adjacent frames C C, and at the top the tube E is provided with a cap-plate, $e'$, which overhangs the body of the tube to allow opposite upper brace-bars, I I, to be bolted to it, and the bent ends of said bars I are bolted, like the braces H, to the posts $c$ $c$ of frames C.

To the cap-plate $e'$ of the tube E the lower ends of opposite upright braces, J J, are bolted, and the upper ends of said braces J are bolted to the platform A. The braces H I J thus give a firm support to the tube E in the space D, and whereby the inner telescoping tube, F, will be held against side motion in every direction. The tube F is open at the top and is closed at the bottom by a plate, $f$, against which the top plate, $g$, of the yoke in which the wheel G is journaled rests. A long bolt or pin, K, is passed through the yoke-plate $g$, the bottom plate, $f$, of tube F, and through the cap-plate $e'$ of tube E. A head, K', at the lower end of bolt K, and a nut or collar, $k'$, at its upper end, prevents disconnection of the wheel-yoke from the tube F or falling of said tube from the tube E, but allows the tube F to be forced upward in the tube E against the tension of a strong spiral spring, L, placed within the tubes E F, and bearing at opposite ends on the cap-plate $e$ and bottom plate, $f$. (See Fig. 4.)

To the forward end of the lower timber, $c'$, of each frame C there are pivoted on a bolt, $m$, a pair of opposite side bars or wheel guard plates, M M, which incline downward and rearward at their lower edges to points at $n$, about level with the periphery of the wheel G just behind, and from these points $n$ bars or plates N N, fixed to bars M M, curve upward and rearward, and at their rear ends are journaled upon studs or gudgeons O O, fixed at opposite sides of the lower part of the telescoping tube F. The shape of the bars N N allows the adjacent wheel G to turn freely around on the bolt K, like a caster-wheel when the vehicle is backing, and the tube F will be raised by the rise of the bars or plates M M. There may be as many of these wheels G and connected parts arranged at each side of the vehicle as its size, the weight of the load to be carried, and the nature of the road to be traveled over may require.

The operation is as follows: Should the truck be drawn over an obstruction—such as a railway-track, a stone, or the like—the successive wheel-guards M will strike the obstruction, and will be lifted thereby on their pivots $m$ and will carry the respective tubes F, with which they are connected, upward, thereby lifting the successive wheels G over the obstacle one at a time and compressing the springs L in the telescoping tubes E F, and as each wheel G passes the obstruction the wheel will be forced to the ground again by the spring. The wheels have broad treads or faces; hence they will not sink into soft ground, but will roll it hard, and will improve the road rather than cut ruts in it, like narrow-tired wheels do. Furthermore, as each spring-supported wheel may rise and fall independently of every other wheel, the vehicle will run more smoothly or with less jolting on uneven roads than vehicles mounted on wheels connected in opposite pairs to axles in the usual way, and as there are many more springs to a vehicle of the same size as ordinarily constructed the durability of the running-gear will be greater than in ordinary wheeled vehicles.

The running-gear herein described may be applied to vehicles of almost any description used in passenger or goods traffic.

Having thus fully described my invention, I claim as new and desire to secure by Letters Patent—

1. A vehicle constructed with a platform, a series of independent caster-wheels arranged at and beneath opposite sides of the platform, and springs held to the platform and sustaining the load on the wheels, substantially as herein set forth.

2. A vehicle constructed with a platform, a series of independent wheels arranged at and beneath opposite sides of the platform, springs sustaining the load on the wheels, and yielding guards, as at M, connected to the platform and to the wheel-supports and ranging downward and rearward toward the treads of the wheels, substantially as herein set forth.

3. A vehicle constructed with a platform, a series of independent caster-wheels arranged at and beneath opposite sides of the platform, springs sustaining the load on the wheels, and yielding guards connected to the platform and to the wheel-supports and ranging downward and rearward toward the treads of the wheels, substantially as herein set forth.

4. In a vehicle running-gear, the combination, with the platform, as at A, of telescoping tubes held thereto, wheels held to the lower tubes, and springs forcing the lower tubes and wheels downward, substantially as herein set forth.

5. A vehicle constructed with a platform, as at A, pendent frames C, connected thereto and separated to provide spaces, as at D, tubes E, having caps $e'$, and fixed in the spaces D, tubes F, fitted to slide in tubes E, a caster-wheel, G, beneath each tube F, a pin, K, holding wheel G to tube F, and passing loosely through the cap of the tube E, and a spring, L, placed within the telescoping tubes E F, substantially as herein set forth.

6. A vehicle constructed with a platform, as at A, pendent frames C, fixed thereto and separated to provide spaces, as at B, telescoping tubes E F, held to and between frames C, wheels, as at G, held to tubes F, springs, as at L, placed within the tubes E F, and guards, as at M, pivoted to frames C, and ranging downward and rearward toward the treads of the wheels, and connected, as at N O, to the tubes F, substantially as and for the purposes herein set forth.

7. In a vehicle running-gear, the combination, with a platform, A, pendent frames C, fixed thereto, telescoping tubes E F, wheels held to tubes F, and springs forcing said tubes and wheels downward, substantially as specified, of the braces H I J, securing the upper tubes, E, to the parts A C, substantially as herein set forth.

WILLIAM B. KELLY.

Witnesses:
W. J. MASEK,
FRANK NEE.